US009292555B2

(12) United States Patent  
Ogura

(10) Patent No.: US 9,292,555 B2  
(45) Date of Patent: Mar. 22, 2016

(54) INFORMATION PROCESSING DEVICE

(75) Inventor: Shoji Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 212 days.

(21) Appl. No.: 14/009,778

(22) PCT Filed: Mar. 15, 2012

(86) PCT No.: PCT/JP2012/001805  
§ 371 (c)(1),  
(2), (4) Date: Jan. 15, 2014

(87) PCT Pub. No.: WO2012/137422  
PCT Pub. Date: Oct. 11, 2012

(65) Prior Publication Data  
US 2014/0129565 A1 May 8, 2014

(30) Foreign Application Priority Data  
Apr. 5, 2011 (JP) ................. 2011-083386

(51) Int. Cl.  
*G06F 17/30* (2006.01)  
*H04L 29/08* (2006.01)  
*H04L 12/24* (2006.01)

(52) U.S. Cl.  
CPC ...... *G06F 17/30321* (2013.01); *G06F 17/3002* (2013.01); *G06F 17/30946* (2013.01);  
(Continued)

(58) Field of Classification Search  
CPC .......... G06F 17/30321; G06F 17/3002; G06F 17/30946; G06F 17/5018; G06F 17/5054; G06F 21/6254; G06T 17/00; G06T 17/10; G06T 15/20; G06T 7/0012; H04L 41/0826; H04L 67/1004; H04L 67/1012; H04L 67/1023  
USPC .......... 707/741, 761; 370/222, 392, 401, 404, 370/463, 245, 254, 223, 224, 232, 236, 231, 370/340; 345/419, 426, 424, 440, 441; 715/823, 802, 715, 852, 798, 801, 800, 715/810; 716/4, 18, 7, 6, 14, 15, 16; 703/4, 703/5, 13, 14, 15; 73/32  
See application file for complete search history.

(56) References Cited

U.S. PATENT DOCUMENTS 5,249,137 A * 9/1993 Wilson et al. ................. 703/2  
5,572,634 A * 11/1996 Duluk, Jr. ................. 345/419  
(Continued)

FOREIGN PATENT DOCUMENTS

CN 1801183 7/2006  
EP 1841178 A1 10/2007  
(Continued)

OTHER PUBLICATIONS

Baochun Li and Wang, K.H.—"NonStop: continuous multimedia streaming in wireless ad hoc networks with node mobility"—Published in: Selected Areas in Communications, IEEE Journal on (vol. 21 , Issue: 10 )—Date of Publication :Dec. 2003—pp. 1627-1641.*

(Continued)

*Primary Examiner* — Anh Ly  
(74) *Attorney, Agent, or Firm* — Wilmer Cutler Pickering Hale and Dorr LLP

(57) ABSTRACT

An information processing device of the present invention includes: an index generating means for generating index data distributedly stored into a plurality of servers, each index data being generated for each data point information including metadata representing a characteristic of data to be searched, and each index data being associated with reference point information that are other data point information such that distances to the each data point information based on a preset reference are within a preset range; and a communication cost storing means for storing, for each of the servers storing the index data, communication cost information representing a preset cost that costs in communication with the server. The index generating means selects the reference point information to be associated with specific one of the data point information, based on the communication cost information of the server storing the index data corresponding to the reference point information.

8 Claims, 8 Drawing Sheets

(52) U.S. Cl.
CPC ........ *H04L41/0826* (2013.01); *H04L 67/1004* (2013.01); *H04L 67/1012* (2013.01); *H04L 67/1023* (2013.01)

(56) References Cited

U.S. PATENT DOCUMENTS

| | | | | |
|---|---|---|---|---|
| 5,638,462 | A * | 6/1997 | Shirakawa | G06K 9/00476 382/186 |
| 6,201,881 | B1 * | 3/2001 | Masuda et al. | 382/100 |
| 6,441,821 | B1 * | 8/2002 | Nagasawa | 345/426 |
| 7,039,054 | B2 * | 5/2006 | Narad et al. | 370/392 |
| 7,555,001 | B2 * | 6/2009 | Coppola et al. | 370/425 |
| 2003/0174204 | A1 * | 9/2003 | Otani | G01C 11/06 348/51 |
| 2004/0024738 | A1 | 2/2004 | Yamane | |
| 2004/0085443 | A1 * | 5/2004 | Kallioniemi | G01N 1/36 348/135 |
| 2005/0216477 | A1 * | 9/2005 | Nakadai | H04L 67/125 707/761 |
| 2006/0066608 | A1 * | 3/2006 | Appolloni | 345/419 |
| 2006/0153457 | A1 | 7/2006 | Nakamura et al. | |
| 2007/0106892 | A1 * | 5/2007 | Engberg | 713/168 |
| 2007/0244915 | A1 * | 10/2007 | Cha et al. | 707/101 |
| 2008/0215842 | A1 * | 9/2008 | Kerschbaum | G06F 21/6254 711/167 |
| 2009/0034937 | A1 * | 2/2009 | Kusunoki et al. | 386/96 |
| 2009/0315908 | A1 * | 12/2009 | Comparan | G06T 15/04 345/582 |
| 2010/0088492 | A1 * | 4/2010 | Chakradhar | G06F 8/00 712/220 |
| 2010/0262717 | A1 * | 10/2010 | Critchley et al. | 709/251 |
| 2010/0306201 | A1 * | 12/2010 | Hirano et al. | 707/741 |
| 2011/0081155 | A1 * | 4/2011 | Matsumoto et al. | 399/50 |
| 2012/0084392 | A1 * | 4/2012 | Lipfert et al. | 709/217 |
| 2012/0126000 | A1 * | 5/2012 | Kunzig | G06Q 10/087 235/385 |

FOREIGN PATENT DOCUMENTS

| | | |
|---|---|---|
| JP | 07-221651 | 8/1995 |
| JP | 2001-117945 | 4/2001 |
| JP | 2001-283141 | 10/2001 |
| JP | 2002-183206 | 6/2002 |
| JP | 2003/330943 A | 11/2003 |
| JP | 2006-190191 | 7/2006 |

OTHER PUBLICATIONS

Shiyuan Wang et al.—"Skyframe: a framework for skyline query processing in peer-to-peer systems"—The VLDB Journal—Jan. 2009, vol. 18, Issue 1, pp. 345-362.*

International Search Report of PCT/JP2012/001805 mailed May 29, 2012 (2 pages).

Rahul Malik, Sangkyum Kim, Xin Jin, Chandrasekar Ramachandran, Jiawei Han, Indranil Gupta, and Klara Nahrstedt, "MLR-index: An Index structure for Fast and Scalable Similarity Search in High Dimensions," SSDBM 2009 Proceedings of the 21st International Conference on Scientific and Statistical Database Management, Springer-Verlag Berlin, Heidelberg, Jun. 2-4, 2009, pp. 167-184.

Bernard Wong, Aleksandrs Slivkins, Emin Gun Sirer, "Meridian: A Lightweight Network Location Service without Virtual Coordinates," SIGCOMM '05 Proceedings of the 2005 conference on Applications, technologies, architectures, and protocols for computer communications, ACM New York, NY, USA, Aug. 22-26, 2005, pp. 85-96.

Kevin Beyer, Jonathan Goldstein, Raghu Ramakrishnan, Uri Shaft, "When is nearest neighbor meaningful?," ICDT '99 Proceedings of the 7th International Conference on Database Theory, Springer-Verlag London, UK, Jan. 10-12, 1999, Lecture Notes in Computer Science, 1999, vol. 1540/1999, pp. 217-235.

Guohui Wang et al., Towards Network Triangle Inequality Violation Aware Distributed Systems, Proceedings of the 7th ACM SIGCOMM conference on Internet measurement [online], ACM, 2007, <retrieval date May. 18, 2012>, retrieval source: ACM Digital Library, p. 175-187.

Doulkeridis, C. et al., "Efficient range query processing in metric spaces over highly distributed data," Distrib, Parallel Databases, vol. 26, pp. 155-180 (2009).

Extended European Search Report issued by the European Patent Office for Application No. 12767981.9 dated Apr. 20, 2015 (11 pages).

Sagy, G. et al., "Top-κ vectorial aggregation queries in a distributed environment," J. Parallel Distrib, Comput., vol. 71, pp. 302-315 (2011).

* cited by examiner

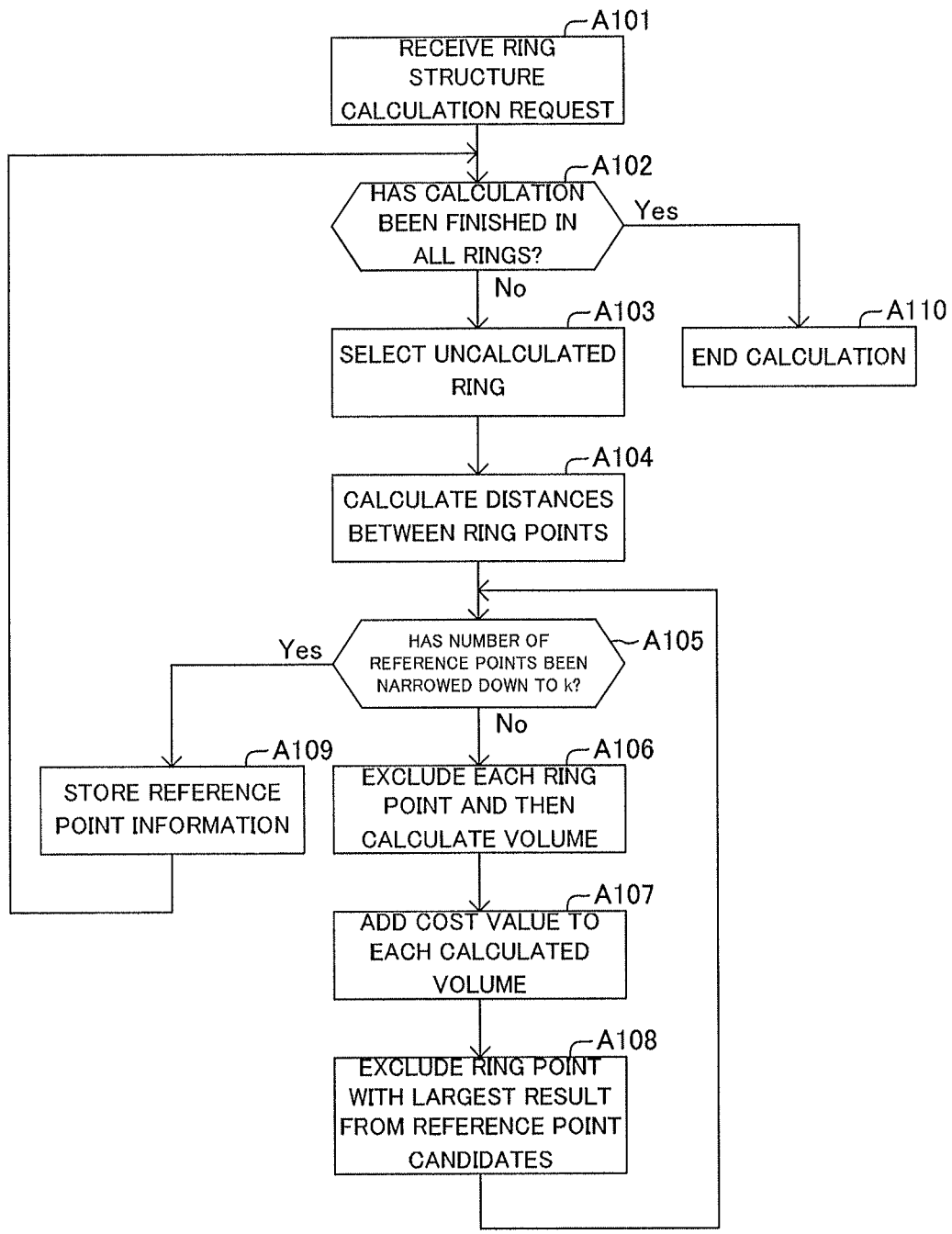

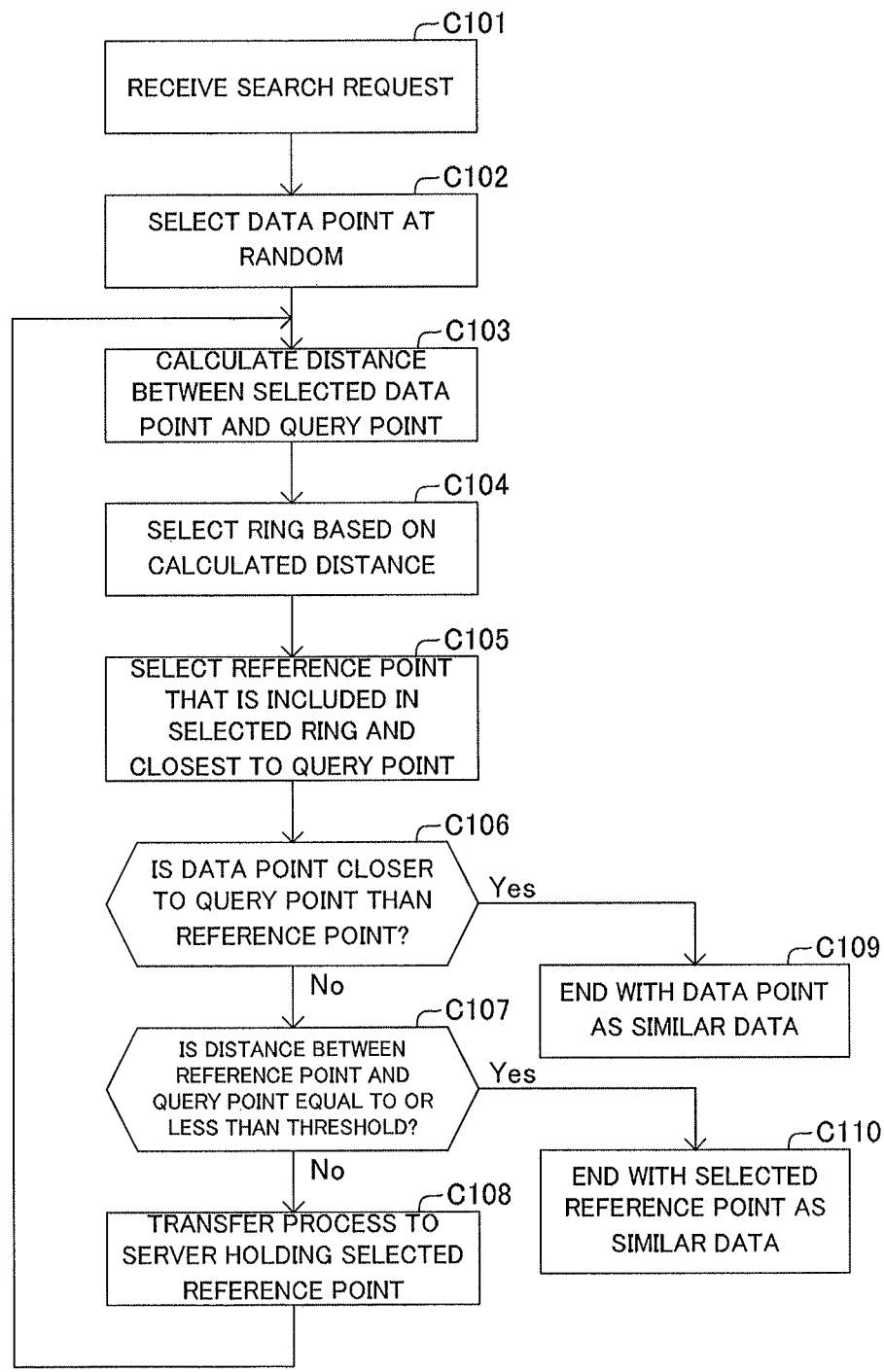

Fig.6A

DATA POINT —E101

DATA 1: $[a_{1\,1}, a_{1\,2}, \cdots, a_{1\,30}]$

DATA 2: $[a_{2\,1}, a_{2\,2}, \cdots, a_{2\,30}]$

DATA 3: $[a_{3\,1}, a_{3\,2}, \cdots, a_{3\,30}]$

⋮

DATA n: $[a_{n\,1}, a_{n\,2}, \cdots, a_{n\,30}]$

MAXIMUM VALUES OF COST AND VOLUME OF POLYHEDRON —E102

$\max_i (V(-i) + \cos(i))$

Fig.6B

| VERTEXES OF FIRST POLYHEDRON | ~E103 | p1: $[0, d_{12}, d_{13}, d_{14}, d_{15}, d_{16}]$ p2: $[d_{21}, 0, d_{23}, d_{24}, d_{25}, d_{26}]$ p3: $[d_{31}, d_{32}, 0, d_{34}, d_{35}, d_{36}]$ p4: $[d_{41}, d_{42}, d_{43}, 0, d_{45}, d_{46}]$ p5: $[d_{51}, d_{52}, d_{53}, d_{54}, 0, d_{56}]$ p6: $[d_{61}, d_{62}, d_{63}, d_{64}, d_{65}, 0]$

| VERTEXES OF SECOND POLYHEDRON | ~E104 | p1: $[0, d_{12}, d_{13}, d_{14}, d_{16}]$ p2: $[d_{21}, 0, d_{23}, d_{24}, d_{26}]$ p3: $[d_{31}, d_{32}, 0, d_{34}, d_{36}]$ p4: $[d_{41}, d_{42}, d_{43}, 0, d_{46}]$ p6: $[d_{61}, d_{62}, d_{63}, d_{64}, 0]$

INFORMATION PROCESSING DEVICE

CROSS-REFERENCE TO RELATED APPLICATIONS

This application is a national stage application of International Application No. PCT/JP2012/001805 entitled "Information Processing Device," filed on Mar. 15, 2012, which claims the benefit of the priority of Japanese Patent Application No. 2011-83386, filed on Apr. 5, 2011, the disclosures of each of which are hereby incorporated by reference in their entirety.

TECHNICAL FIELD

The present invention relates to an information processing device, more specifically, relates to an information processing device having a function of creating an index of each metadata in a case where metadata of data to be searched is distributedly stored into a plurality of servers.

BACKGROUND ART

A system that processes media data such as image data and speech data is widely used in recent years. A demand for such a system is increasing from the aspects of functions and requirements, for example, increase of the processing capability of computers, development of analysis techniques, and a request for safety in monitoring systems and the like. Such a media data analysis system executes processes such as extraction of a region including a person from media data and conversion of speech data into text data.

Search of similar data is a function regarded as a task for a system that processes media data. A media data analysis system needs to retrieve data similar to query data from a large amount of stored data, in a use case such as search of a similar image and determination of similarity of a speech. Similar data mentioned herein is defined for each data type, and a method for determination and a threshold of similarity vary.

A tree-structure index generally used for lower dimensions may cause a problem for search of similar data in high-dimensional data like media data. An index of tree structure like a KD-Tree is commonly used as a multidimensional index. A tree-structure index enables search in log order, which is effective enough when the dimension is not high. However, in a case where a tree-structure index is used for high-dimensional data, there arises a problem that divided regions become sparse and efficient search cannot be performed. This problem is pointed out in Non-Patent Document 3, for example.

Further Non-Patent Document 1 suggests a MLR index which is an index having ring structure, for similarity search in high-dimensional data. This MLR index can be used in a metric space defined by data points and a distance function. Use of this index structure makes it possible to efficiently find similar data with respect to a query point with a certain probability.

In the MLR index, each ring point has a ring structure that is layered according to distances. The layered ring has a structure that the radii of the rings exponentially increase from the center. Each ring contains (k+1) ring points as shown in FIG. 1 of Non-Patent Document 1. Among the ring points, k ring points are reference points to be compared and/or searched. Search of a similar point is performed by comparing distances between the reference points and a query point.

The remaining one ring point other than the reference points is a spare point. The spare point is a point that, unlike the reference points, does not become the target for comparison at the time of search but becomes a candidate at the time of selection of the reference points from the ring points. Such a structure enables search of a point similar to a query point in log order.

Search with a ring-structure index is performed in the following manner. First, a data point is selected at random, and a ring-structure index that the data point has is selected. Next, a distance between a query point and the data point is calculated, and a ring including the query point is selected based on the distance. Then, distances between the query point and the respective reference points within the selected ring are calculated, and a reference point that is the nearest to the query point is selected as a nearest neighbor reference point. In a case where the distance between the nearest neighbor reference point and the query point is more than the distance between the data point in the center and the query point, the data point is returned as a similar point. On the other hand, in a case where the distance between the nearest neighbor reference point and the query point is within a predetermined distance, the reference point is returned as a similar point. In a case other than the above cases, the nearest neighbor reference point is selected as a data point, and the search process is continued. Because the distance gradually becomes short, it is apparent that the data points converge when the number thereof is finite.

For creation of a ring-structure index used for this search, a method for selecting k reference points contained in a ring is important. For example, in a case where a method for selecting reference points is inappropriate and a reference point that is sufficiently near a query point cannot be found, a similar point cannot be found. Therefore, it is necessary to select k reference points from (k+1) ring points so that a distance between any query point and a nearest neighbor reference point becomes small. For realizing this, in Non-Patent Document 2, reference points are selected so that, defining "dij" as a distance between a reference point i and a reference point j, the volume of a k-dimensional polyhedron composed of k k-dimensional point [di1, di2, . . . , dik] the origin becomes maximum. The structure of this index is based on the structure used in Non-Patent Document 2, and methods for searching an index and constructing an index are described in detail in Non-Patent Document 2.

On the other hand, the amount of data to be searched is continuously increasing in recent years, and expansion of database by scale out is required. The amount of media data is large. Therefore, in the case of intending to process a large amount of data by expanding the capability of a server, namely, by scale up, there is no server that can process or, even if such a server exists, it will be extremely expensive. Accordingly, it is necessary to process a large amount of data by making a plurality of servers operate in parallel, namely, by scale out.

Non-Patent Document 1: Rahul Malik, Sangkyum Kim, Xin Jin, Chandrasekar Ramachandran, Jiawei Han, Indranil Gupta, and Klara Nahrstedt, "MLR-index: An Index Structure for Fast and Scalable Similarity Search in High Dimensions," SSDBM 2009 Proceedings of the 21st International Conference on Scientific and Statistical Database Management, Springer-Verlag Berlin, Heidelberg, Jun. 2-4, 2009, pp 167-184

Non-Patent Document 2: Bernard Wong, Aleksandrs Slivkins, Emil Gun Sirer, "Meridian: A Lightweight Network Location Service without Virtual Coordinates," SIGCOMM '05 Proceedings of the 2005 conference on Applications, technologies, architectures, and protocols for computer communications, ACM New York, N.Y., USA, Aug. 22-26, 2005, pp 85-96

Non-Patent Document 3 Kevin Beyer, Jonathan Goldstein, Raghu Ramakrishnan, Uri Shaft, "When is nearest neighbor meaningful?," ICDT '99 Proceedings of the 7th International Conference Database Theory, Springer-Verlag London, UK, January 10-12, Lecture Notes in Computer Science, 1999, Volume 1540/1999, pp 217-235

However, distributed storage of the index suggested in Non-Patent Document 3 as it is into a plurality of servers causes a problem that communication between the servers increases and the efficiency of search of data decreases. This is because, in a case where the data is distributed stored as it is and reference points are held in different servers, communication occurs at the time of tracing the reference points, and the cost of communication increases.

SUMMARY

Accordingly, an object of the present invention is to provide an information processing device capable of solving the abovementioned problem; the efficiency of data search decreases in a system in which data to be searched is distributedly stored into a plurality of servers.

An information processing device of an aspect of the present invention is an information processing device including:

an index generating means for generating index data that are distributedly stored into a plurality of servers, respectively, each of the index data being generated for each of data point information including metadata representing a characteristic of data to be searched and each of the index data being associated point information that are others of the data point information such that the each data point information based on a previously set reference are within a previously set range; and a communication cost storing means for storing, for each of the servers storing the respective index data, communication cost information representing a previously set cost that costs in communication with the server, wherein the index generating means is configured to select the reference point information to be associated with specific one of the data point information, based on the communication cost information of the server storing the index data corresponding to the reference point information.

Further, a program of another aspect of the present invention is a computer program including instructions for:

causing an information processing device to realize an index generating means, wherein the information processing device includes a communication cost storing means for storing, for each of servers storing respective index data, communication cost information representing a previously set cost that costs in communication with the server, and the index generating means is a means for generating index data that are distributedly stored into a plurality of servers, respectively, each of the index data being generated for each of data point information including metadata representing a characteristic of data to be searched, and each of the index data being associated with reference point information that are others of the data point information such that distances to the each of the data point information based on a previously set reference are within a previously set range; and causing the index generating means to select the reference point information to be associated with specific one of the data point information, based on the communication cost information of the server storing the index data corresponding to the reference point information.

Further, an information processing method of another aspect of the present invention is an information processing method in an information processing device including a communication cost storing means for storing, for each of servers storing index data, communication cost information representing a previously set cost that costs in communication with the server, the information processing method including:

when generating index data that are distributedly stored into a plurality of servers, respectively, each of the index data being generated for each of data point information including metadata representing a characteristic of data to be searched, and each of the index data being associated with reference point information that are others of the data point information such that distances to the each of the data point information based on a previously set reference are within a previously set range, selecting the reference point information to be associated with specific one of the data point information, based on the communication cost information of the server storing the index data corresponding to the reference point information.

With the configurations as described above, the present invention can increase the efficiency of data search in a system in which data to be searched is distributedly stored into a plurality of servers.

BRIEF DESCRIPTION OF DRAWINGS

FIG. 4 is a flowchart showing the operation in an index construction process by the data holding server disclosed in FIG. 1;

FIG. 5B is a flowchart showing the operation in a search process using the index by the data holding server disclosed in FIG. 1;

FIG. 6A is a view for describing an example of an index creation process; and

FIG. 6B is a view for describing an example of a reference creation process.

EXEMPLARY EMBODIMENTS

Figure 1:
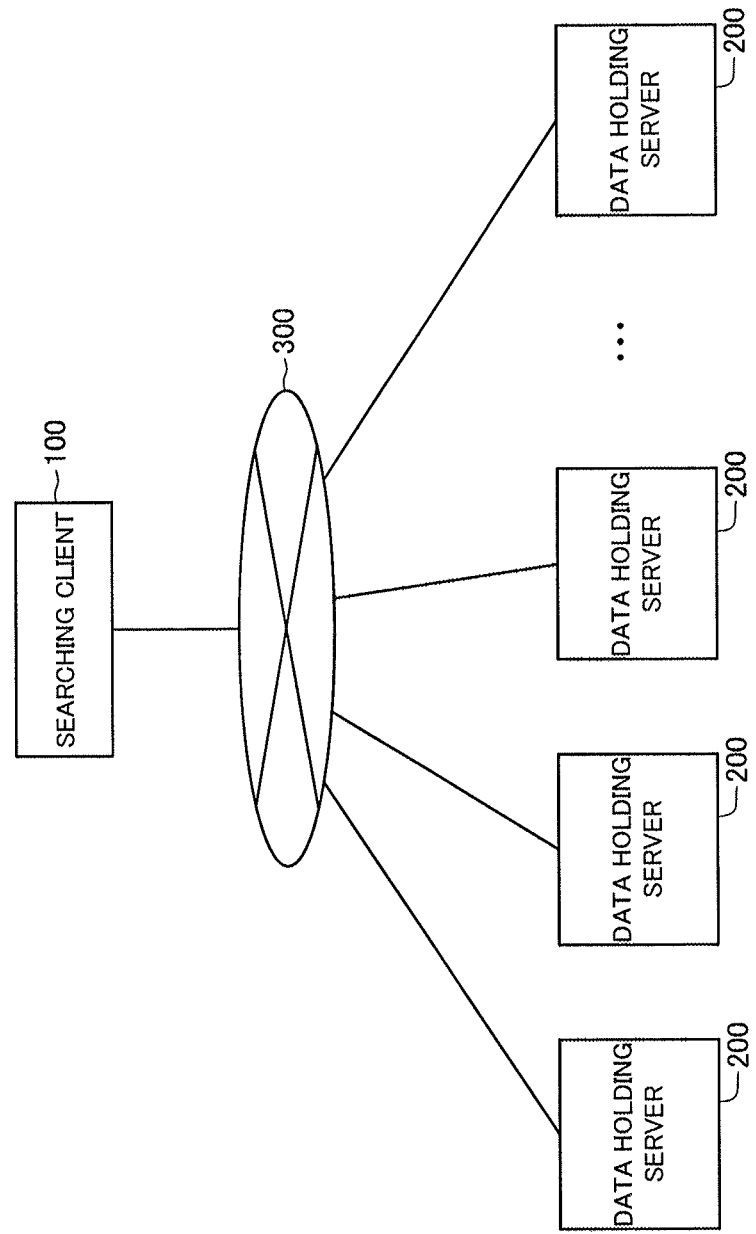
FIG. 1 is a block diagram showing the overall structure of an information processing system according to the present invention.
Figure 2:
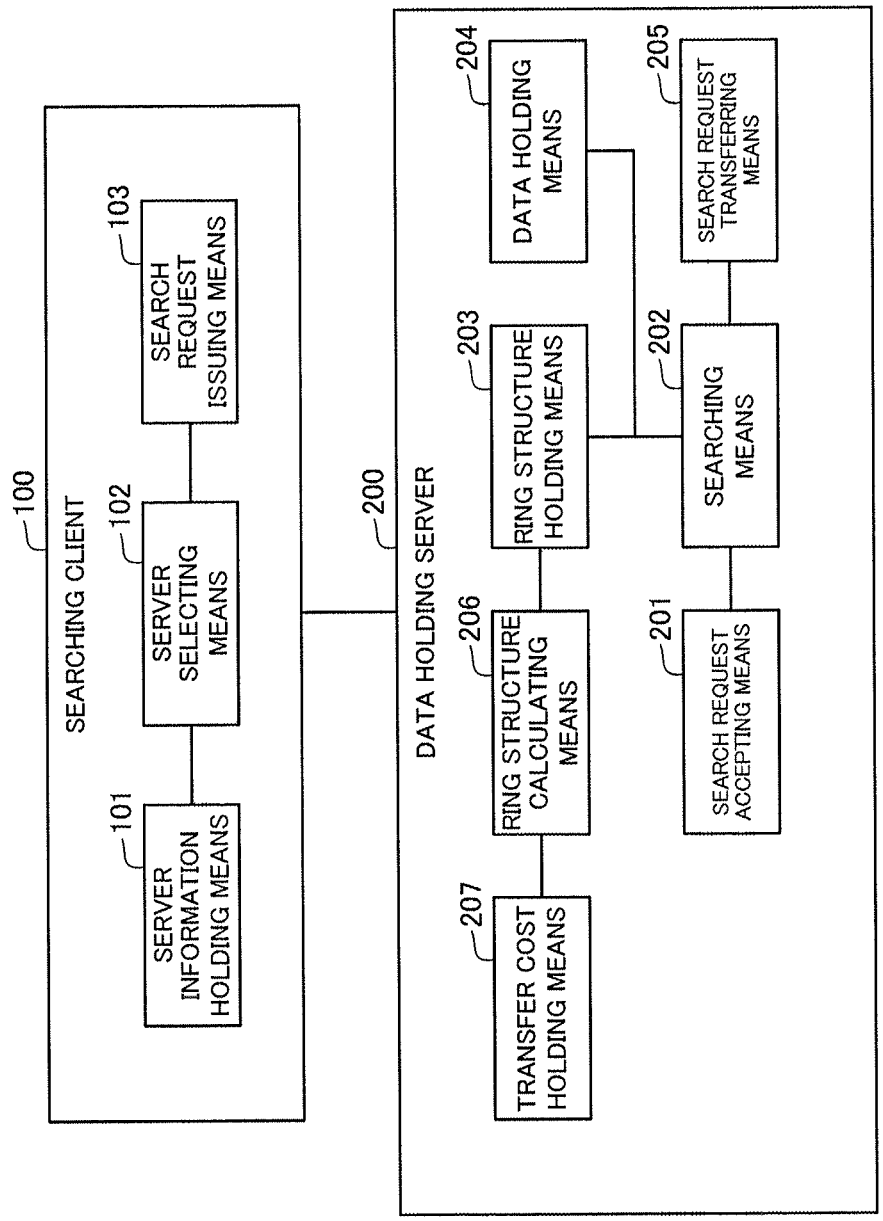
FIG. 2 is a function block diagram showing the configuration of a searching client and a data holding server disclosed in FIG. 1.
Figure 3:
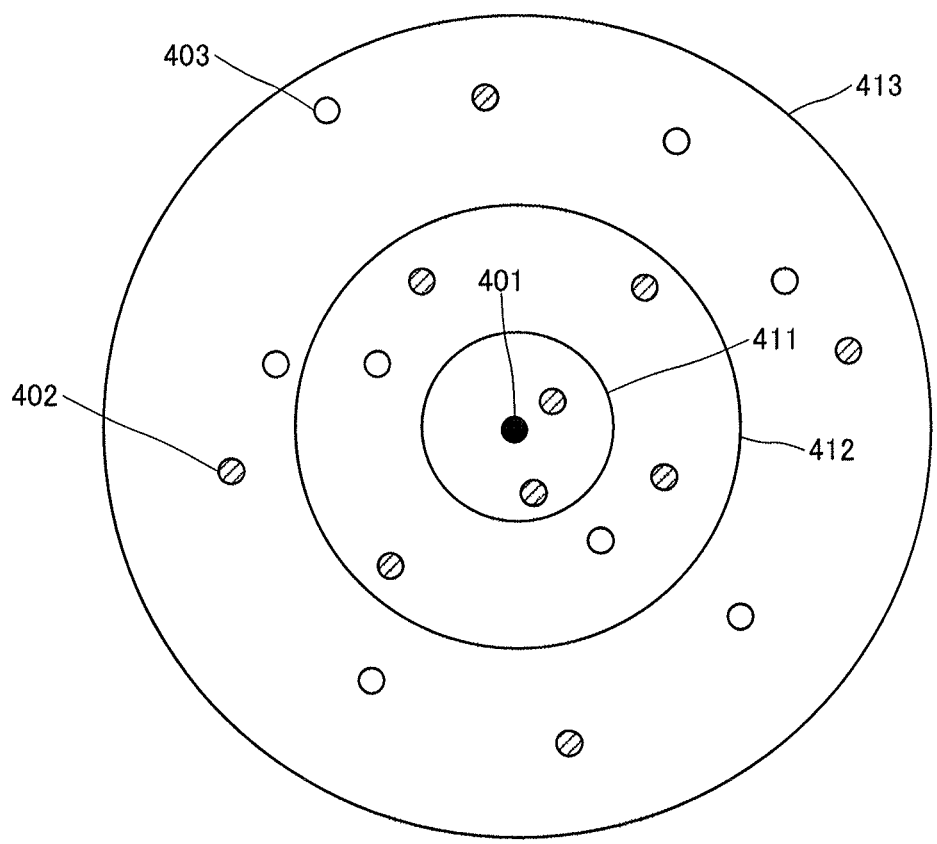
FIG. 3 is a schematic diagram showing the configuration of an index used in the present invention.

Referring to FIGS. 1 to 6, a first exemplary embodiment of the present invention will be described. FIGS. 1 to 3 are diagrams for describing the configuration of an information processing system, and FIGS. 4 to 6B are views for describing the operation of the information processing system.

The information processing system in this exemplary embodiment is a system that performs similarity search on media data such as image data and speech data, and the system described herein is one having a configuration that an index of data to be searched is distributedly stored into a plurality of servers. However, the information processing system according to the present invention is not limited to a system performing similarity search on media data, and may be a system performing any data search.

[Configuration]

As shown in FIG. 1, the information processing system in this exemplary embodiment includes a searching client (a central processing unit; a processor; a data processing device) 100 that operates under program control, a plurality of data holding servers (a central processing device; a processor; a data processing device) 200 that operate under program control, and a network 300 for performing communication between the searching client 100 and the plurality of data holding servers 200.

The searching client 100, which is an information processing terminal connected to the network 300, includes a server information holding means 101, a server selecting means 102 and a search request issuing means 103 as shown in FIG. 2. The operations of the respective means are briefly described below.

The server information holding means 101 holds request destination data, which is data including the addresses of the data holding servers 200. The server information holding means 101 passes the request destination data of the data holding servers 200 held thereby in response to a request by the server selecting means 102.

The server selecting means 102 receives the request destination data of the data holding servers 200 held by the server information holding means 101, and selects request destination data of a proper one of the data holding servers 200. For selection of request destination data of a proper data holding server 200, a request from the searching client evenly reaches the data holding servers 200. For example, the server selecting means 102 may select a data holding server 200 with the smallest load depending on the load conditions of the data holding servers 200. Alternatively, for example, the server selecting means 102 may select from the data holding servers 200 at random.

The search request issuing means 103 issues a request for search of data similar to an inputted query, to a request destination as the data holding server 200 selected by the server selecting means 102. In response to the search request issued by the search request issuing means 103, similar data searched and found or a result representing a failure of search is returned from the data holding server 200 described later, and the result is returned to the source of input.

Next, the configuration of the data holding server 200 will be described. The data holding server 200 is an information processing device including a calculation device and a storage device. As shown in FIG. 2, the data holding server 200 includes a search request accepting means 201, a searching means 202, a ring structure holding means 203, a data holding means 204, a search request transferring means 205, a ring structure calculating means 206, and a transfer cost holding means 207. As described later, the data holding server 200 stores the body of data to be searched in the data holding means 204, and stores an index used for search in the ring structure holding means. However, the ring structure calculating means 206 and the transfer cost holding means 207 are not necessarily incorporated in the same information processing device as a device where the data and the indexes are stored, and may be incorporated in another information processing device.

The search request accepting means 201 receives a search request transmitted from the searching client 100 or the other data holding server 200, and asks the searching means 202 to search similar data. Moreover, after obtaining a search result from the searching means 202, the search request accepting means 201 returns the result to the searching client 100 or the other data holding server 200 that is a requesting source of the search request.

The searching means 202 executes search of similar data in accordance with a request for search of similar data received from the search request accepting means 201. At this moment, the searching means 202 performs search of similar data by using the indexes for similar data search held by the ring structure holding means 203, for example, performs search of data similar to a condition included in a search request in accordance with a preset reference. In a case where similar data is found by using the indexes for similar data search held by the ring structure holding means 203, the searching means 202 acquires target data from the data holding means 204 and returns the data as a result. The detailed search process flow will be described in description of an operation later.

The ring structure holding means 203 (an index storing means) holds a ring structure index as an index for similarity search. The ring structure index held by the ring structure holding means 203 is created by the ring structure calculating means 206. The ring structure index held by the ring structure holding means 203 is used by the searching means 202 at the time of search of similar data corresponding to a search request.

The data holding means 204 holds the body of data indicated by the ring structure index managed by the ring structure holding means 203, that is, the body of data referred to by a data point, which will be described later, located in the center of the ring structure index. The index managed by the ring structure holding means 203 is usually only metadata, and may be different from the requested data body. Therefore, the data holding means 204 holds the body of data indicated by the index managed by the ring structure holding means 203, and returns the data body in response to a request from the searching means 202.

As described later, in a case where another data holding server 200 other than one server whose searching means 202 has performed a search process has a ring structure index around a reference point that becomes similar data corresponding to a search request, the search request transferring means 205 transfers the search request to the other data holding means 200. Indexes managed by the ring structure holding means 203 of one data holding server 200 are not indexes of all data. Therefore, regarding an index of data held by another data holding server 200, there is a need to transfer a search request and continue similarity search in the other data holding server 200. Because indexes managed by the ring structure holding means 203 contain information that represents a relation between data and data holding servers 200 holding the respective data, the search request transferring means 205 transfers the search request based on the relation information.

The ring structure calculating means 206 (an index generating means) creates a ring structure index for each data to be searched, and transmits to the ring structure holding means 203, as described later. This ring structure calculating means 206 calculates a ring structure index for similarity search from data, a distance function for calculating a distance between data, and the cost of transfer of a process between the data holding servers 200. Herein, data that is the target for calculation of a ring structure index is data held by the data holding means 204 of the own server 200, and the ring structure calculating means 206 calculates an index associated with other data such that a distance based on a previously set reference for metadata of the target data is within a preset range. Moreover, a distance function for calculating a distance between data may use a Euclidian distance in a vector space, or may be changed depending on the type of data. This calculation procedure will be described in the description of a process flow.

The transfer cost holding means 207 (a communication cost storing means) holds a cost value that is used by the ring structure calculating means 206 for calculating a ring structure index for similarity search and that represents a preset transfer cost occurring at the time of processing between the data holding servers 200. The cost value of processing between the data holding servers 200 may be a constant value, or may be different values on which the network connection configuration of the data holding servers 200 is reflected and which are defined for each combination of the data holding servers 200. For example, the cost value is a communication time when communication is performed between the data holding servers 200, a delay time for a certain reference value, and the like. The communication time and the delay time may be values depending on a network connection configuration and a difference in processing capability between the data holding servers 200.

Next, FIG. 3 shows a ring structure index for similarity search. Referring to FIG. 3, a ring structure index for similarity search includes a data point 401 represented by a black circle in the center, a reference point 402 represented by a shaded circle around, a spare point 403 represented by a white circle around, and rings 411, 412 and 413 concentrically drawn around the data point 401. Although the respective points are mapped two-dimensionally, this is an expression for the convenience of illustration, and it is not necessary to limit to two-dimensional data.

The data point 401 is point information corresponding to data to be searched, and is located in the center of a ring structure index corresponding to the data to be searched. The data point 401 has metadata in a metric space as information representing a characteristic of the data to be searched corresponding to the data point 401, and reference data to the body of the data. Herein, the reference data to the data body, and so on, will not be described.

Further, the reference point 402 and the spare point 403 are point information corresponding to different data to be searched from that of the data point 401, and have metadata representing a characteristic of the data to be searched and reference data to the data body in the same manner as described above. The reference point 402 and the spare point 403 are mapped in the ring structure index in accordance with a distance from the data point 401, that is, a distance of the metadata from the data point 401. For example, the reference points 402 and the spare points 403 such that a distance to the data point 401 based on a previously set reference is within a preset range are mapped in the ring structure index, and associated with the data point 401 located in the center. Moreover, each of the reference points 402 and the spare points 403 stores information of the data holding server 200 where a ring structure index around the point itself is stored, and holds data for calculating a distance from another point. The reference points 402 and the spare points 403 are collectively referred to as ring points.

Each of the rings 411, 412 and 413 is a set of points having a given distance from the data point 401. Each of the rings is arranged so that, in a case where the number counted from the ring near the data point 401 is set to "i," the distance becomes $\alpha s^{(i-1)}$ That is to say, a distance from the data point 401 of the ring 411 that is the nearest to the data point 401 is a, a distance from the data point 401 of the ring 412 that is the next nearest to the data point 401 is αs, and a distance from the data point 401 of the ring 413 is $\alpha s^2$.

The number of the reference points 402 between the ring 411 and the ring 412 and the number of the reference points between the ring 412 and the ring 413 are each limited to a preset number "k" or less. For example, in a case where the number "k" is set to "4," the number of the reference points 402 included in a region between the ring 412 and the ring 413 is up to four. When creating a ring structure index, it is determined whether to hold the reference point 402 as a reference point for the data point 401 that is the center of the ring structure index, and the number of the reference points 402 is regulated so as to become "k" in each region between the rings in the ring structure index. Moreover, the number of the spare points 403 between the ring 411 and the ring 412 and the number of the spare points 403 between the ring 412 and the ring 413 are each limited to "1," for example. When a ring structure index is created, a point that is not selected as a reference point is set to a spare point, and the number of the spare points is regulated so as to become "1."

For each data to be searched, a ring structure index (index data) as described above is generated around a data point corresponding to the data to be searched. The ring structure indexes are distributedly stored into the data holding servers 200, respectively, together with the data body of corresponding data to be searched.

[Operation]

Figure 5A:
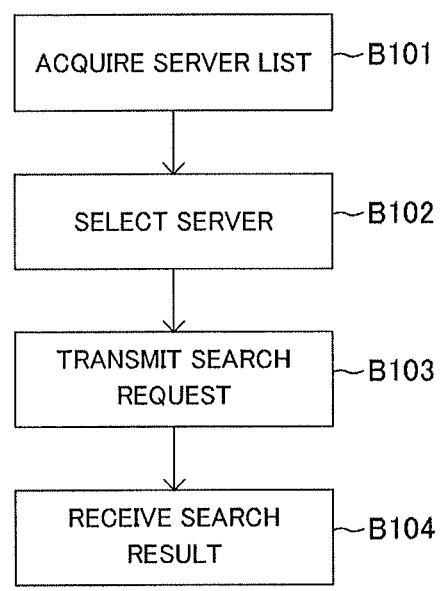
FIG. 5A is a flowchart showing the operation in a search process by the searching client disclosed in FIG. 1.

Next, referring to flowcharts of FIGS. 4 and 5, the operation of the whole information processing system will be described in detail. The flow of the operation includes a flow of calculation of a ring structure index shown in FIG. 4, and a flow of search of similar data shown in FIGS. 5A and 5B. The respective process flows are independent, and therefore, will be described individually.

First, the ring structure calculating means 206 receives a ring structure calculation request (step A101). The ring structure calculating means 206 having received the ring structure calculation request starts a process on held data. This process is a process of selecting the reference points 402 of a ring structure index around each data point. Although only a process on one data point will be described below, the ring structure calculating means 206 executes the following process on each data point including metadata and so on of data to be searched stored by the own data holding server 200, thereby generating a ring structure index and storing and holding it.

Subsequently, the ring structure calculating means 206 confirms whether it has executed the process of selecting the reference points 402 in all regions between rings around the data point 401 (step A102). In a case where calculation has been finished in all of the regions between rings and the reference points 402 have been selected, the ring structure calculating means 206 ends the ring structure index creation process on the data point 401 (step A110).

On the other hand, in a case where the ring structure calculating means 206 determines at step A102 that it has not executed the process of selecting the reference points 402 in all regions between rings around the target data point 401, the ring structure calculating means 206 selects an uncalculated region between rings (step A103), and calculates all distances between ring points included in the region between rings (step A104). In a case where the number of reference point candidates has been narrowed down to "k," the ring structure calculating means 206 stores the reference point information and returns to step A102 (step A105).

In the case of determining at step A105 that the number of reference point candidates has not been narrowed down to "k," the ring structure calculating means 206 selects reference point candidates so that the volume of a polyhedron formed by respective distances between reference point candidates becomes large. To be specific, it is assumed that, when "dij" is defined as a distance between a reference point candidate i and a reference point candidate j and n is defined as the number of reference point candidates, the coordinates of point pi on the n-dimensional space is [di0, di1, di2, . . . , dij, . . . , din], where dii=0. Thus, it is possible to defined pi with respect to each reference point candidate i, and it is considered to maximize the volume of a polyhedron on the n-dimensional space formed by the pi and the origin. As the respective distances between reference points become smaller, the volume of the polyhedron becomes smaller. Therefore, by selecting reference points so as to form the polyhedron as large as possible, it becomes easier to find reference points near a query point even if the query point is in any place between rings. In order to find a set of candidates of reference points forming a polyhedron with a volume as large as possible, it is necessary to calculate the volume of a polyhedron with respect to all combinations of the reference point candidates. However, because calculation with respect to all the combinations leads to a large amount of calculation, a simplified method as described below is used in this exemplary embodiment.

First, each reference point candidate among n reference point candidates is excluded, and the volume of a polyhedron on the (n−1)-dimensional space is found (step A106). To be specific, when one reference point pi is excluded, the coordinates of point pj on the (n−1)-dimensional space is [di0, di1, . . . , di(i−1), di(i+1), djn]. A polyhedron is formed from this point, and the volume of the polyhedron is found. Herein, the volume of a polyhedron when a reference point candidate i is excluded shall be "V(−i)."

Next, to each of the volumes of the polyhedrons, a cost value corresponding to the ring point excluded from the reference point candidates is added (step A107). Herein, a cost value is a value that is previously set for the data holding server 200 storing ring structure index data corresponding to a ring point and stored in the transfer cost holding means 207 as described before. When "i" is defined as a cost value corresponding to the reference point candidate i, the value found above is "V(−1)+ci." At this moment, a value that costs between the data holding server 200 corresponding to the data point 401 and the data holding 200 corresponding to the reference point candidate stored as the cost value this value is used.

Then, a reference point candidate i whose value of "V(−i)+ci" as the result obtained at step A107 is the largest is excluded from the reference point candidates (step A108). A reference point candidate excluded at step A108 is a point having a characteristic that an influence on the volume of a polyhedron when the point is excluded is small, or a point having a characteristic that the cost corresponding to the point is high. As a result, a set of reference points such that the reference cost is low and it is easy to find a point close to any query point is selected and, when the number of the reference point candidates is narrowed down to "k" (step A105), reference point information thereof is stored (step A109).

Next, referring to the flowcharts of FIGS. 5A and 5B, the flow of a process of searching similar data will be described. The flow of search of similar data includes a flow by the searching client 100 (FIG. 5A) and a flow by the data holding server 200 (FIG. 5B).

First, at the time of start of search, a server list is acquired from the server information holding means 101 (step B101). Then, the server selecting means 102 selects the data holding server 200 to which a search request is to be issued, from the server list acquired at step B101 (step B102).

Next the search request issuing means 103 issues a search request to the data holding server 200 selected at step B102 (step B103). Finally, the search request issuing means 103 receives the result of the issued search request from the data holding server 200 (step 13104).

Next, referring to FIG. 5B, the similar data search flow by the data holding server 200 will be described. When the data holding server 200 receives a search request (step C101), a data point is selected at random from ring structure indexes held by the ring structure holding means 203 (step C102).

When a data point is selected, a distance between the selected data point and a query point is calculated (step C103). A method for calculating the distance is previously determined. A ring of "$\alpha s^{(i-1)} < d \leq \alpha s^i$" when "d" is defined as the distance is selected (step C104). Selecting such a ring is selecting a ring including the query point.

Then, all of the k reference points included in the selected ring are acquired, the respective distances between the query point and the k reference points included in the selected ring are calculated, and a reference point that is the closest to the query point is selected (step C105).

Then, it is determined whether the distance between the query point and the selected reference point is greater than the distance between the query point and the data point (step C106). In a case where the distance between the query point and the selected reference point is greater than the distance between the query point and the data point, the query point is closer to the data point than the reference point. Thus, the data point is determined as similar data, and the search process is ended (step C109). On the other hand, in a case where the distance between the query point and the selected reference point is equal to or less than the distance between the query point and the data point, it is determined whether the distance between the query point and the selected reference point is equal to or less than a threshold (step C107). In a case where the distance between the query point and the selected reference point is equal to or less than the threshold consequently, the selected reference point is determined as similar data, and the search process is ended (step C110). In a case where the distance between the query point and the selected reference point is not equal to or less than the threshold, it is necessary to continue the search process. In this case, the process is executed again with the selected reference point as a data point. Because the selected data point may exist in a different data holding server 200, the process request is then transferred to the other data holding servers 200 (step C 108).

Accordingly, the information processing device in this exemplary embodiment constructs a ring structure index by executing a process so as to construct an index in consideration of a process transfer cost between servers. Therefore, it is possible to decrease a process transfer cost between servers when executing a search process, and it is possible to make a search process time short.

EXAMPLE

Next, a specific example using the abovementioned information processing system will be described. Herein, only the ring structure index creation process will be described.

FIGS. 6A and 6B show data representation used in this example. A data point E101 shown in FIG. 6A includes n data. In this example, each of the data is represented as 30-dimensional vector data. On this vector data, the Euclidian distance shall be used as a metric space. Moreover, it is assumed that k=3 and l=4.

When a ring is selected at step A103 described above at the time of creation of a ring structure index, a distance between ring points is calculated. Herein, "dij" is defined as a distance between a ring point i and a ring point j. Hereinafter, a process of selecting three reference points from among seven ring points is executed.

At step A106 described above, the volume of a multidimensional polyhedron formed by points each having a distance between ring points as the value of the dimension is found. When data points 1 to 7 are selected as ring points of reference candidates, E103 of FIG. 6B shows vertexes other than the origin forming a polyhedron with the data point 7 excluded. For example, a point p1 shows that the value of the first dimension is "0" and the value of the second dimension is "d1 2." The volume of a polyhedron formed by these points can be found or approximated by a generally known method for finding the volume of a multidimensional polyhedron. Herein, the volume of a multidimensional polyhedron with a data point i excluded is denoted by "V(−i)." For example, the volume of a multidimensional polyhedron with the data point 7 excluded is "V(−7)."

For each of the data points, the volume of a multidimensional polyhedron with points defined by distances with the data point excluded is found, and thereafter, the volume and a cost value are summed, and a data point with the largest value is selected. E102 of FIG. 6A shows a general expression. Based on the expression, "i" satisfying E102 is selected and, assuming the data point 5 is selected, the data point 5 is excluded from the reference point candidates.

When the data point 5 is excluded from the reference point candidates, the number of the reference point candidates becomes six, though initially seven. E104 of FIG. 6B shows vertexes other than the origin forming a polyhedron with the data point 7 excluded after the data point 5 is excluded from the reference point candidates.

The process is executed as described above and, when the number of the reference point candidates is narrowed down to three, the process of selecting the reference points is ended. Such a process is executed on all regions between rings and all data points, whereby a ring structure index is generated.

<Supplementary Notes>

The whole or part of the exemplary embodiments disclosed above can be described as the following supplementary notes. Below, the outline of the configurations of the information processing device and so on according to the present invention will be described. However, the present invention will not be limited by the following configurations.

(Supplementary Note 1)

An information processing device including:

an index generating means for generating index data that are distributedly stored into a plurality of servers, respectively, each of the index data being generated for each of data point information including metadata representing a characteristic of data to be searched, and each of the index data being associated with reference point information that are others of the data point information such that distances to the each data point information based on a previously set reference are within a previously set range; and a communication cost storing means for storing, for each of the servers storing the respective index data, communication cost information representing a previously set cost that costs in communication with the server, wherein the index generating means is configured to select the reference point information to be associated with specific one of the data point information, based on the communication cost information of the server storing the index data corresponding to the reference point information.

(Supplementary Note 2)

The information processing device according to Supplementary Note 1, wherein the index generating means is configured to select a previously set number of the reference point information to be associated with the specific one of the data point information, based on the communication cost information of the server storing the index data corresponding to the reference point information.

(Supplementary Note 3)

The information processing device according to Supplementary Note 1 or 2, wherein the index generating means is configured to: exclude one of reference point candidate information from among the reference point candidate information that are the others of the data point information to become candidates of the reference point information for the specific one of the data point information and calculate, with reference to one of remainder of the reference point candidate information, a coordinate point such that coordinates are distances of others of the reference point candidate information; calculate a volume of a polyhedron such that each of vertexes is the coordinate point calculated with reference to each of the remainder of the reference point candidate information; and select the reference point information to be associated with the specific one of the data point information, based on the calculated volume and the communication cost information of the server storing the index data corresponding to the excluded one of the reference point candidate information.

(Supplementary Note 4)

The information processing device according to Supplementary Note 3, wherein the index generating means is configured to select the reference point information by excluding, from among the reference point information to be associated with the specific one of the data point information, the excluded one of the reference point candidate information such that a value obtained by adding the communication cost information of the server storing the index data corresponding to the excluded one of the reference point candidate information to the calculated volume is larger than any values obtained when others of the reference point candidate information are excluded, respectively.

(Supplementary Note 5)

The information processing device according to any of Supplementary Notes 1 to 4, wherein:

the communication cost storing means is configured to store communication cost information representing a previously set cost that costs in communication between the servers, as the communication cost information for each of the servers storing the index data; and the index generating means is configured to select the reference point information to be associated with the specific one of the data point information, based on the communication cost information between the server storing the index data corresponding to the specific one of the data point information and the server storing the index data corresponding to the other of the data point information to become the candidates of the reference point information.

(Supplementary Note 6)

The information processing device according to Supplementary Note 5, wherein the communication cost storing means is configured to store information representing a previously set cost that costs in communication between the servers and that occurs depending on a difference in processing capability between the abovementioned servers, as the communication cost information for each of the servers storing the index data.

(Supplementary Note 7)

The information processing device according to any of Supplementary Notes 1 to 6, including:

an index storing means for storing the index data corresponding to predetermined one of the data point information;

a search request accepting means for accepting a request for search of the data to be searched;

a searching means for searching the data point information corresponding to the search request accepted by the search request accepting means in accordance with a previously set reference, from the index data stored in the index storing means; and a search request transferring means for transferring the search request to another information processing device in a case where the searching means determines that the data point information corresponding to the search request accepted by the search request accepting means in accordance with the previously set reference does not exist in the index data stored in the index storing means.

(Supplementary Note 8)

A computer program including instructions for:

causing an information processing device to realize an index generating means, wherein the information processing device includes a communication cost storing means for storing, for each of servers storing respective index data, communication cost information representing a previously set cost that costs in communication with the server, and the index generating means is a means for generating index data that are distributedly stored into a plurality of servers, respectively, each of the index data being generated for each of data point information including metadata representing a characteristic of data to be searched, and each of the index data being associated with reference point information that are others of the data point information such that distances to the each of the data point information based on a previously set reference are within a previously set range; and causing the index generating means to select the reference point information to be associated with specific one of the data point information, based on the communication cost information of the server storing the index data corresponding to the reference point information.

(Supplementary Note 9)

The computer program according to Supplementary Note 8, wherein the index generating means is configured to: exclude one of reference point candidate information from among the reference point candidate information that are the others of the data point information to become candidates of the reference point information for the specific one of the data point information and calculate, with reference to one of remainder of the reference point candidate information, a coordinate point such that coordinates are distances of others of the reference point candidate information; calculate a volume of a polyhedron such that each of vertexes is the coordinate point calculated with reference to each of the remainder of the reference point candidate information; and select the reference point information to be associated with the specific one of the data point information, based on the calculated volume and the communication cost information of the server storing the index data corresponding to the excluded one of the reference point candidate information.

(Supplementary Note 10)

An information processing method in an information processing device including a communication cost storing means for storing, for each of servers storing index data, communication cost information representing a previously set cost that costs in communication with the server, the information processing method including:

when generating index data that are distributedly stored into a plurality of servers, respectively, each of the index data being generated for each of data point information including metadata representing a characteristic of data to be searched, and each of the index data being associated with reference point information that are others of the data point information such that distances to the each of the data point information based on a previously set reference are within a previously set range, selecting the reference point information to be associated with specific one of the data point information, based on the communication cost information of the server storing the index data corresponding to the reference point information.

(Supplementary Note 11)

The information processing method according to Supplementary Note 10, including, when generating the index data: excluding one of reference point candidate information from among the reference point candidate information that are the others of the data point information to become candidates of the reference point information for the specific one of the data point information and calculating, with reference to one of remainder of the reference point candidate information, a coordinate point such that coordinates are distances of others of the reference point candidate information; calculating a volume of a polyhedron such that each of vertexes is the coordinate point calculated with reference to each of the remainder of the reference point candidate information; and selecting the reference point information to be associated with the specific one of the data point information, based on the calculated volume and the communication cost information of the server storing the index data corresponding to the excluded one of the reference point candidate information.

Although the present invention has been described above referring to the above exemplary embodiments, the present invention is not limited to the exemplary embodiments described above. The configurations and details of the present invention can be modified in various manners that can be understood by a person skilled in the art within the scope of the present invention.

The present invention is based upon and claims the benefit of priority from Japanese patent application No. 2011-083386, filed on Apr. 5, 2011, the disclosure of which is incorporated herein in its entirety by reference.

Description of Reference Numerals 100 searching client
101 server information holding means
102 server selecting means
103 search request issuing means
200 data holding server
201 search request accepting means
202 searching means
203 ring structure holding means
204 data holding means
205 search request transferring means
206 ring structure calculating means
207 transfer cost holding means
300 network

The invention claimed is:

1. An information processing device comprising:
an index generating unit for generating index data that are distributedly stored into a plurality of servers, respectively, each of the index data being generated for each of data point information including metadata representing a characteristic of data to be searched, and each of the index data being associated with reference point information that are others of the data point information such that distances to the each data point information based on a previously set reference are within a previously set range; and a communication cost storing unit for storing, for each of the servers storing the respective index data, communication cost information representing a previously set cost that costs in communication with the server, wherein the index generating unit is configured to select the reference point information to be associated with specific one of the data point information, based on the communication cost information of the server storing the index data corresponding to the reference point information, and wherein the index generating unit is configured to:
exclude one of reference point candidate information from among the reference point candidate information that are the others of the data point information to become candidates of the reference point information for the specific one of the data point information and calculate, with reference to one of remainder of the reference point candidate information, a coordinate point such that coordinates are distances of others of the reference point candidate information;

calculate a volume of a polyhedron such that each of vertexes is the coordinate point calculated with reference to each of the remainder of the reference point candidate information; and select the reference point information to be associated with the specific one of the data point information, based on the calculated volume and the communication cost information of the server storing the index data corresponding to the excluded one of the reference point candidate information.

2. The information processing device according to claim 1, wherein the index generating unit is configured to select a previously set number of the reference point information to be associated with the specific one of the data point information, based on the communication cost information of the server storing the index data corresponding to the reference point information.

3. The information processing device according to claim 1, wherein the index generating unit is configured to select the reference point information by excluding, from among the reference point information to be associated with the specific one of the data point information, the excluded one of the reference point candidate information such that a value obtained by adding the communication cost information of the server storing the index data corresponding to the excluded one of the reference point candidate information to the calculated volume is larger than any values obtained when others of the reference point candidate information are excluded, respectively.

4. The information processing device according claim 1, wherein:
the communication cost storing unit is configured to store communication cost information representing a previously set cost that costs in communication between the servers, as the communication cost information for each of the servers storing the index data; and
the index generating unit is configured to select the reference point information to be associated with the specific one of the data point information, based on the communication cost information between the server storing the index data corresponding to the specific one of the data point information and the server storing the index data corresponding to the other of the data point information to become the candidates of the reference point information.

5. The information processing device according to claim 4, wherein the communication cost storing unit is configured to store information representing a previously set cost that costs in communication between the servers and that occurs depending on a difference in processing capability between the abovementioned servers, as the communication cost information for each of the servers storing the index data.

6. An information processing device comprising:
an index generating means unit for generating index data that are distributedly stored into a plurality of servers, respectively, each of the index data being generated for each of data point information including metadata representing a characteristic of data to be searched, and each of the index data being associated with reference point information that are others of the data point information such that distances to the each data point information based on a previously set reference are within a previously set range;

a communication cost storing unit for storing, for each of the servers storing the respective index data, communication cost information representing a previously set cost that costs in communication with the server;

an index storing unit for storing the index data corresponding to predetermined one of the data point information;

a search request accepting unit for accepting a request for search of the data to be searched;

a searching unit for searching the data point information corresponding to the search request accepted by the search request accepting unit in accordance with a previously set reference, from the index data stored in the index storing unit; and a search request transferring unit for transferring the search request to another information processing device in a case where the searching unit determines that the data point information corresponding to the search request accepted by the search request accepting unit in accordance with the previously set reference does not exist in the index data stored in the index storing means unit, wherein the index generating unit is configured to select the reference point information to be associated with specific one of the data point information, based on the communication cost information of the server storing the index data corresponding to the reference point information.

7. A non-transitory computer-readable medium storing a computer program comprising instructions for:
causing an information processing device to realize an index generating unit, wherein the information processing device includes a communication cost storing unit for storing, for each of servers storing respective index data, communication cost information representing a previously set cost that costs in communication with the server, and the index generating unit is a unit for generating index data that are distributedly stored into a plurality of servers, respectively, each of the index data being generated for each of data point information including metadata representing a characteristic of data to be searched, and each of the index data being associated with reference point information that are others of the data point information such that distances to the each of the data point information based on a previously set reference are within a previously set range; and causing the index generating unit to select the reference point information to be associated with specific one of the data point information, based on the communication cost information of the server storing the index data corresponding to the reference point information, wherein the index generating unit is configured to:
exclude one of reference point candidate information from among the reference point candidate information that are the others of the data point information to become candidates of the reference point information for the specific one of the data point information and calculate, with reference to one of remainder of the reference point candidate information, a coordinate point such that coordinates are distances of others of the reference point candidate information;

calculate a volume of a polyhedron such that each of vertexes is the coordinate point calculated with reference to each of the remainder of the reference point candidate information; and select the reference point information to be associated with the specific one of the data point information, based on the calculated volume and the communication cost information of the server storing the index data corresponding to the excluded one of the reference point candidate information.

8. An information processing method in an information processing device including a communication cost storing unit for storing, for each of servers storing index data, communication cost information representing a previously set cost that costs in communication with the server, the information processing method comprising:

generating index data that are distributedly stored into a plurality of servers, respectively, each of the index data being generated for each of data point information including metadata representing a characteristic of data to be searched, and each of the index data being associated with reference point information that are others of the data point information such that distances to the each of the data point information based on a previously set reference are within a previously set range, selecting the reference point information to be associated with specific one of the data point information, based on the communication cost information of the server storing the index data corresponding to the reference point information, wherein when generating the index data the method further comprises:

excluding one of reference point candidate information from among the reference point candidate information that are the others of the data point information to become candidates of the reference point information for the specific one of the data point information and calculating, with reference to one of remainder of the reference point candidate information, a coordinate point such that coordinates are distances of others of the reference point candidate information;

calculating a volume of a polyhedron such that each of vertexes is the coordinate point calculated with reference to each of the remainder of the reference point candidate information; and selecting the reference point information to be associated with the specific one of the data point information, based on the calculated volume and the communication cost information of the server storing the index data corresponding to the excluded one of the reference point candidate information.

* * * * *